Dec. 6, 1960

G. WIGGERMANN
MECHANICAL POWER CONVERTER OF
VARIABLE TRANSMISSION RATIO 2,962,915

Filed Aug. 18, 1955

G. WIGGERMANN
MECHANICAL POWER CONVERTER OF
VARIABLE TRANSMISSION RATIO 2,962,915

Filed Aug. 18, 1955

G. WIGGERMANN
MECHANICAL POWER CONVERTER OF
VARIABLE TRANSMISSION RATIO 2,962,915

Filed Aug. 18, 1955

United States Patent Office 2,962,915
Patented Dec. 6, 1960

2,962,915
MECHANICAL POWER CONVERTER OF VARIABLE TRANSMISSION RATIO

Georg Wiggermann, Kressbronn, Kreis Tettnang, Germany, assignor of one-half to Walter Reiners, M.-Gladbach, Rhineland, Germany Filed Aug. 18, 1955, Ser. No. 529,091

Claims priority, application Germany Aug. 18, 1954

15 Claims. (Cl. 74—687)

My invention relates to a mechanical power converter of variable transmission ratio. Such converters serve for adapting the torque-speed ratio of a power delivering machine or motor to the demand of a power receiving machine, for instance, a vehicle, the product torque times revolving speed being supposed to remain constant ($T \cdot n =$ constant). The latter requirement is the essential criterion for genuine torque converting operation.

In order to meet this requirement, a converter would have to possess an infinite number of transmissions of respectively different ratio following one another in a stepless sequence within the desired range of conversion; and this is indeed the case with the so-called stepless transmissions heretofore proposed and built for such purposes.

However, the known stepless devices applicable for the transmission of large power quantities require inconveniently large overall dimensions and their efficiency of transmission is not sufficient for most applications. For that reason, the use of such converters, essentially, has been limited to cases where the possibility of a stepless change in transmission ratio was of greatly preponderant importance.

In contrast thereto, an ordinary spur-gear transmission is in effect a power or torque converter which, as to dimensions, weight and efficiency, is sufficient for most cases of application and which for that reason, despite certain disadvantages peculiar to spur gears, is still predominantly used in practice. However, particularly with reference to automotive vehicles, the requirements placed upon the desired properties of torque converters have become so exacting that there is now a considerable demand for a better converter than heretofore available. In order to explain this situation, the essential advantages and deficiencies of the spur-gear type of transmission may be enumerated as follows:

Advantages:

(A1) Very good mechanical efficiency, (2) Completely slip-less transmission of the driving torque under all operating conditions and independently of wear, (3) Relatively small weight per power, (4) Relatively favorable dimensions, (5) Operation relatively poor in noise, (6) Slight wear and correspondingly long period of useful life, (7) Slight maintenance requirements and slight operating cost.

Disadvantages:

(B1) Due to the necessary subdivision of the converter transmission range into relatively few steps, a genuine converter operation satisfying the condition ($T \cdot n =$ constant) is possible only in coarse approximation.

(2) During each change in transmission ratio (gear shift) the transmission of power through the converter must be interrupted with the aid of an additional friction clutch.

(3) The adaptation of the revolving speed after each gear shift involves losses due to coupling friction.

(4) The gear components to be placed into meshing engagement when shifting gears must be placed on equal speed by means of synchronizing devices which are correlated to each step and must be effective prior to shifting the gears.

(5) The transmission ratio $i = n_1/n_2$ cannot be increased to the value $i = \infty$, that is, to the standstill condition of the converter output shaft. Hence the output shaft cannot be accelerated from the standstill condition.

The above-recited advantages do not require further explanation. Relative to the disadvantages, however, it may be mentioned that they make themselves disagreeably felt particularly in automotive vehicles. The disadvantage B1 does not permit a full utilization of the available power output of the engine under all operating conditions. The disadvantage B2 has a similar effect; it causes losses and makes it difficult to shift gears, for instance, on upgrades, downgrades and on rough terrain. The disadvantage B3 is in evidence particularly when starting from standstill and causes losses and difficulties of operation. Disadvantage B4 increases the dimensions and the manufacturing cost of the gearing. Disadvantage B5 limits the utilizable power output of the engine within the speed range below that of the first gear step, it makes it difficult to maneuver the vehicle on upgrades, downgrades and in rough terrain, and it increases the danger of accidents as well as the requirements placed upon the skill of the driver.

It is an object of my invention to provide a converter of variable transmission ratio which combines the advantages of the stepless type of gearing with those of the spur-gear gearing but which minimizes or eliminates the disadvantages of the latter type.

To this end, a converter according to my invention comprises a multi-step spur-gear mechanism which permits an only contour-constrained, i.e. positive meshing between the individual gear components and hence does not include any friction clutches or couplings, in combination with a plurality of intermediate gear shafts (counter shafts), and an auxiliary drive which controls the relative revolving speeds of the intermediate gear shafts and which alternately controls the respective counter shafts so as to vary, during progression from low to high output speed or vice versa, the transmission ratio of the driving connection first between one counter shaft and the converter input shaft and then the transmission ratio of the other counter shaft.

In such a converter there are provided, between the input shaft and the output shaft of the converter, several gear-type connections, operating in pairs or individually, of which each is correlated to one of the intermediate counter shafts. Each of the intermediate shafts carries spur gears of respectively different numbers of teeth which form gear pairs of respectively different transmission ratio together with main spur gears connected with the converter output shaft, the gears of each pair being shiftable into and out of positive meshing engagement relative to one another.

An important component of the new converter is the auxiliary drive. This drive has two rotary members each of which is capable of operating as a transmitter while the other is operating as a receiver at a time. Each of these members has its shaft coaxially aligned with one of said respective counter shafts and when operating as the transmitter or input member of the auxiliary drive, derives its power from the converter input shaft and is capable of controlling the speed of the aligned counter shaft so that the speed ratio of the two counter shafts changes between the values 1/1 and 1/C, wherein C is a constant magnitude depending upon the fixed graduation of speed ratios existing between the sequential steps of the spur-gear speed-change mechanism. The converter is provided with pairs of inter-engageable gears which selectively connect the intermediate shafts with the converter output shaft and which produce constrained meshing engagements between the converter output shaft and the converter input shaft. These pairs of gears, when in selective meshing engagement, form the individual gear steps of the converter and they are so graduated relative to one another that the transmission ratio changes from step to step in accordance with a series of powers of the above-mentioned constant value C progressing in integers.

It is an essential characteristic of such a converter that, due to the change in speed of the intermediate shafts resulting from the change in transmission ratio of the auxiliary drive, and also due to the graduation between the individual steps in accordance with the constant C, the auxiliary drive has two definite control settings in which those speed-change gears of the spur-gear mechanism that are to be shifted into or out of meshing engagement are in "synchronism" so that they can be shifted without impact and without coaction of a friction coupling or any synchronizing devices extraneous to the above-mentioned auxiliary drive.

According to a preferred embodiment of the invention, the two intermediate counter shafts are equipped with identical respective spur gears so that each of the available converter transmission ratios (i.e. the speed ratio between input shaft and output shaft of the converter) can be established as a "double connection" in which the flow of power passes simultaneously through both intermediate counter shafts. In one of the two settings of the auxiliary drive for synchronism, both intermediate shafts have the same speed so that their speed ratio is $i=1/1$; and on both intermediate shafts two respective spur gears of the same number of teeth are then in meshing engagement to transmit power to the output shaft of the converter. In the other control setting of the auxiliary drive in which synchronism will occur, the two intermediate shafts have the speed ratio $1=1/C$; and the two spur gears of the respective intermediate shafts then in meshing operation appertain to two adjacent speed steps of the converter, i.e. these two steps have respective transmission ratios that form with each other the value C, this being tantamount to stating that the two transmission ratios are different from each other by a power of C.

These double connections between converter input shaft and converter output shaft, possible with the two respective speeds of synchronism, permit shifting from speed step to speed step without any interruption in the train and flow of power transmission. That is, by virtue of such a double connection the converter step in operation prior to the gear shift can remain in meshing engagement until after the next following gear step is shifted into operative condition.

On account of the above-mentioned features, a converter according to the invention can operate, for instance, in the following manner. For increasing the output speed of the converter by gear-shifting, one of the intermediate gear shafts is first decelerated down to the lower synchronous speed, this being done by correspondingly changing the control setting of the auxiliary drive. Then the spur gear which on the decelerated intermediate shaft corresponds to the next higher converter step is shifted into meshing engagement thus establishing the above-mentioned double connection. Thereafter the previously operating gear of the other intermediate shaft is shifted out of meshing engagement so that only the last-shifted gear of the first mentioned intermediate shaft is in power transmitting operation. Subsequently, the auxiliary drive is controlled to accelerate the now operative intermediate shaft with the newly engaged gear. Since this gear is drivingly connected with the output shaft of the converter, the output shaft is likewise accelerated by the auxiliary drive. This is done until the upper synchronous speed is reached. Thereafter, the next gear step on the other intermediate shaft can be shifted into operation thus re-establishing the double connection between input and output shaft of the converter. Depending upon the particular switching system still to be described, the operation of the converter, as long as no further gear shift is desired, can either be continued by permitting the double connection to remain effective, or one of the two intermediate shafts can now be taken out of the train of power transmission by disengaging its pair of spur gears.

A desired reduction in the output speed of the converter is effected as follows. At first the revolving speed of an intermediate shaft not participating in the transmission of power between input shaft and output shaft is increased to the upper synchronous speed by correspondingly changing the control setting of the auxiliary drive. When upper synchronous speed is reached, the one spur gear on the intermediate shaft that then runs in synchronism with one of the respective main gears on the converter output shaft is shifted into meshing engagement therewith. This establishes a double connection. Thereafter, the previously active gear pair of the other intermediate shaft is shifted into disengagement. Now the first-mentioned intermediate gear is alone effective to transmit power between input and output shafts. Thereafter, the auxiliary drive is controlled to decelerate the last-mentioned intermediate shaft together with the converter output shaft. This is done until the reduced speed is such that on the first-mentioned intermediate shaft the next lower gear than that previously operative reaches the condition of synchronism and can be shifted into meshing engagement.

This sequence of operations during gear shift, when switching upwardly (toward higher converter output speeds) as well as when switching downwardly (toward lower converter output speeds), can be repeated as often as desired and is completely independent of the number of gear steps. As a result, the steps of the converter can be given any desired high number and thus the jump between the individual steps can be made as small as desired.

The above-mentioned lower and upper synchronous speeds are not constant. They depend upon the input speed of the converter and also upon the transmission ratio between the converter input shaft and the intermediate shaft. However, since a change in converter input speed has the same effect upon all gear components connected with the input shaft, such change can be neglected in the following considerations and, as mentioned, the two occurring speeds of synchronism can be assigned to two definite transmission ratios respectively between the converter input shaft and the two intermediate shafts that participate in the step-change operation.

Under these circumstances the auxiliary drive might consist simply of a two-step gearing to be switched with the aid of friction couplings. In this manner, a gear shifting operation could already be obtained which eliminates the disadvantages mentioned as items B1, B2, B4. However, the disadvantages mentioned under B3 and B5 would continue to persist. In order to also eliminate the latter disadvantages, and in accordance with another feature of my invention, the auxiliary drive of the converter consists of a hydrostatically operating hydraulic drive and comprises two positive-displacement devices joined together in a liquid circulation system, each being capable of operating as a fluid transmitter (pump) or fluid receiver (motor) depending upon which device is being driven at a time. Since these devices have a design of a pump and are capable of pump operation they are hereinafter briefly referred to as "pump." At least one of these two pumps, namely the one that forms the transmitter of the hydraulic system, has controllable volumetric delivery (cm.$^3$ per revolution) so that the speed of the other pump, acting as the receiver of the system, is controllable in a stepless manner from standstill in either direction of rotation up to the available maximum speed.

With such a hydraulic positive-displacement drive, and in accordance with another feature of the invention, the driving connection of at least one of the intermediate counter shafts with the converter input shaft can be selectively controlled so that the intermediate shaft is either at rest or, for starting, will accelerate together with the converter output shaft if the latter is in geared connection with the intermediate shaft, thus passing from standstill in genuine torque-converting operation and in the desired direction of rotation up to a definite maximum speed. In the same manner, the intermediate shaft driven from the auxiliary drive and, as the case may be, also the converter output shaft, can be decelerated from any speed down to standstill. With such an operation, there exists a rigidly operating meshing engagement between output and input shaft of the converter, but with a transmission ratio of 1:∞, so that the converter input shaft can be revolved freely whereas the converter output shaft remains in condition of enforced standstill, i.e. is blocked.

On account of these properties of the converter, a vehicle equipped therewith can travel at any desired slow speed forward and reverse without any difficulty or unsteadiness of operation and without use of the vehicle brakes and can be maneuvered as desired on each kind of travel surface such as upgrades, downgrades, muddy or icy terrain. Besides, there is no danger of the vehicle coasting inadvertently away from standstill.

As a result of the stepless controllability of the intermediate-shaft speed by the hydraulic positive-displacement drive, the disadvantage of the conventional spur-gear speed-change gearing mentioned under B3 is also eliminated. This is so because with the aid of the auxiliary drive the speed of the intermediate shafts, when passing from the upper to the lower synchronous speed and vice versa, and hence when passing from any one of the given spur-gear transmission ratios to the next, can be effected by genuine torque converting operation and in a fully continuous manner.

Especially well suitable as hydraulic positive-displacement drives for the purpose of the invention consist of pumps whose volume-displacing devices are formed by a plurality of pistons and cylinders, the cylinders of each pump being combined to a block of drum shape or star shape, and the pistons being controlled by a tumbling disk of adjustable or fixed inclination, or by a ring of adjustable or fixed eccentricity. The adjustable modifications of such pumps permit a control or regulation of volumetric delivery and delivering direction, whereas these magnitudes remain constant or are dependent only upon the direction of rotation in the pumps having a fixed inclination or eccentricity of the piston-controlling member.

The seal between piston and cylinder and at other sealing surfaces of such a hydraulic drive is so good that the volumetric delivery varies only slightly even with great changes in pressure of the working liquid (oil) and is always very well in accordance with each particular control setting of the controllable-delivery pump.

These qualities are very favorable for the application of this type of drive within a converter according to the invention because the change in the intermediate-shaft speed required for each gear shift to always maintain the constant ratio C, corresponds to an always identical, predetermined displacement travel of the control member of the hydraulic drive. That is, a displacement of the pump control member between two accurately fixed points will always produce the required accurate change in speed. This affords a relatively simple structural design of the master control means of the converter that are preferably provided for automatically performing the switching steps in the proper sequence needed for the speed-change operations. A slight transmission error of the hydraulic auxiliary drive that may affect the condition of synchronism, is equally effective upon all converter steps and hence can be corrected by a slight correction at the control members in the master control device of the converter.

As mentioned, at the beginning and at the end of each shift between steps, the fact that the same constant C applies to the graduation between the transmission ratios of adjacent steps as well as to the periodic changes in speed of the intermediate shaft effected by the auxiliary drive, produces a state of synchronism of the particular members of the gear pair to be switched. As a result, no separate synchronizing device is required so that the spur-gear speed-change mechanism can be given a simple design, and the costs of such a converter are lower than those of the known converters of comparable performance.

A further improvement to the same end is obtained by designing the spur-gear speed-change mechanism with axially displaced spur-gear members and giving the intermediate shafts a squared profile, extending parallel to the shaft axis or on a helix, on which the counter gears are seated as interconnected pairs which cannot rotate relative to the shaft but are axially displaceable relative thereto in order to be placed into and out of meshing engagement with the corresponding main gear members.

This type of spur-gear mechanism is very simple and can be manufactured at relatively low cost. As a result, the manufacturing cost of the entire converter can be reduced, or for a given cost limit the converter can be equipped with a relatively large number of steps. The continuously controllable auxiliary drive, as explained, affords a continuous change in transmission ratio of the converter from standstill of the converter output shaft up to its highest speed, while during the interval of such operation the rigidly operating spur-gear steps proper are hardly called upon to perform power transmitting duty. However, in order to improve the average efficiency, and in accordance with a feature of the invention, the master control means of the converter effect the shift between converter steps in such a manner that, outside of the step-change intervals, the converter operates only with the rigidly transmitting spur-gear members and hence with the high efficiency afforded by a spur-gear transmission. This operation makes it advantageous to provide the converter with a relatively great number of steps; and this is readily possible, without excessive cost, with the above-mentioned multi-step spur-gear mechanism having axially displaceable gear members.

The wear at the oil-seal surfaces of the hydraulic drive may eventually have the result that the synchronous speed values to be set by means of the hydraulic auxiliary may show slight variations depending upon the torque. This may affect the accurate synchronization of the gear members to be placed into meshing engagement with each other at a time. Furthermore, to facilitate shifting the pairs of spur gears that at any time establish or terminate the double connection, it is of advantage to relieve this gear pair of any torque load during the shifting operation. This can be effected without appreciable difficulty, by having the control device of the hydraulic drive controlled not only by the master control means of the converter that serve to effect the gear shifting operation but also, with the aid of additional means, by the oil pressure in the two oil passages that interconnect the pumps of the hydraulic drive, so that the control setting of the hydraulic drive is correctively controlled by any change in oil pressure prior to the gear shifting operation. In particular cases it is also desirable to have the dependence between the control position of the hydraulic drive and the transmission ratio of that drive less rigid than described above, in order to permit the use of certain types of auxiliary drives of controllable transmission ratio that satisfy the condition of rigidity only to a lesser extent. The use of such lower-quality auxiliary drives in a converter according to the invention is not objectionable if their control member is subjected to similar additional corrective magnitudes as just mentioned, or if such auxiliary drives have a device which continuously supervises the actually existing transmission ratio of the auxiliary drive and performs a regulating operation upon the transmission ratio so as to secure the correct value required for establishing the synchronous condition.

It will be recognized from the foregoing that, generally, each shifting between operating steps of the converter requires a double variation in the transmission ratio of the auxiliary drive. However, as explained below, the invention also provides for a particular combination of the auxiliary drive with a multi-step spur-gear mechanism, wherein for each step-shifting operation only a single variation of the auxiliary-drive transmission-ratio is required so that the control member of the auxiliary drive is returned to the original position only after each second shifting operation. Before describing this more in detail the following may be mentioned:

Conveniently, each variation in transmission ratio of the auxiliary drive may be called "cycle." Consequently, in view of the foregoing, the types of switching operation occurring with a converter according to the invention may be designated as "single-cycle" and "two-cycle" operation respectively. Furthermore, the entire step-changing operation in its individual phases may well be compared with a caterpiller motion inasmuch as this operation involves certain points of standstill (comparable with the action of the rigid spur-gear transmission) and also certain periods of movement (comparable with the switching phases of the converter during which the change in transmission ratio and speed effected by the auxiliary drive takes place). Consequently, the shifting operation of the new converter may be designated, for distinction, as single-cycle or two-cycle caterpillar operation.

According to the invention the change in the speed ratio of two intermediate shafts required for the step-changing operation can be effected by maintaining one intermediate shaft, by means of a rigidly operating connection with the converter input shaft, continuously at constant speed relative to the speed of the converter input shaft, whereas only the speed of the other intermediate shaft is varied by means of the auxiliary drive. This results in a converter of two-cycle caterpillar operation.

However, the change in speed ratio of two intermediate shafts required for step-changing operation, can also be obtained by having the auxiliary drive control both intermediate shafts so that the speed of one shaft increases while the speed of the other decreases to the same degree, and vice versa. This results in a converter of single-cycle caterpillar operation.

The single-cycle caterpiller operation, in comparison with two-cycle operation, has the advantage that with the same number of converter steps only one-half the number of intermediate-shaft gears and main gears in the multi-step spur-gear mechanism are required. This type of converter is preferable when a large number of converter steps is desired.

According to a preferred embodiment of the invention, the spur-gear mechanism of the converter consists of a main shaft, formed by the converter output shaft, two intermediate counter shafts parallel to the main shaft, and main gears secured to the main shaft and having respectively different numbers of gear teeth, each of the main gears being engaged by, or engageable with, one of two respective groups of spur gears on the intermediate shafts.

As a result, the counter gears of each intermediate shaft are exchangeably identical. This is also favorable relative to the manufacturing cost of the mechanism.

Still referring to the preferred embodiment of the new converter, it is another feature of the invention that the converter input shaft is coaxially aligned with the main shaft of the spur-gear mechanism and hence with the converter output shaft, and is directly connectable with the output shaft by means of a clutch capable of establishing a positive driving connection between input and output shafts. This clutch connection has the effect of a gear step, namely of the so-called "direct drive." Generally, this is the highest gear step (highest converter output speed) and during operation, for instance of an automatic vehicle, is the step most often in operation because it involves no spur gears or other loss-producing gear connections in the flow of transmitted power. However, if desired and as often used in vehicle propulsion drives, spur-gear transmissions may be provided on the intermediate shafts for driving the output shaft at a still higher speed (overdrive).

Further, more specific features of the invention aim at a simplest possible, space saving construction of the converter by a most favorable combination or integration of the multi-step spur-gear mechanism and the auxiliary drive, also toward largest possible reduction in the share of the entire power transmission to be imposed upon the auxiliary drive, thus relieving the auxiliary drive from wear, reducing the overall dimensions of the auxiliary drive and reducing the influence of its efficiency upon the overall efficiency of the converter.

By virtue of the versatile control properties of the hydrostatic auxiliary drive, the new converter can generally always be so designed that a certain reverse speed of the converter output shaft can be obtained, by a corresponding control of the pump in the auxiliary drive, although the converter is set for operation in the first step forward. This is particularly easy to be done in all designs having two-cycle caterpillar operation. In contrast thereto, such a reversing operation with the converter set for first step forward can be obtained in single-cycle operation only up to a slight reverse speed of the converter output shaft; and this reverse speed, effected only by changing the control position of the auxiliary drive, is insufficient in most cases. In other words, if it were desired to obtain reversibility in the first step forward only by changing the control setting of the auxiliary drive, then the control range of the hydraulic drive available for traveling in the normal, forward direction would be unfavorably reduced unless an increase in dimensions of the auxiliary drive is to be put up with. Relative to single-cycle operation therefore, it is preferable, according to another feature of the invention, to provide the spur-gear speed-change mechanism itself with an additional reversing step which can be switched into operation either alone or together with the first step forward. The simultaneous operation of the first step forward and of the reverse step is to be applied only at the moment when, shifting from first step forward to reverse travel or vice versa, the rigidly transmitting, constrained connection between input shaft and output shaft of the converter is to be maintained.

The continuous coupling by positive meshing engagement between input shaft and output shaft of the converter is not always desired. For that reason, and in accordance with another feature of the invention, the new converter, aside from having a gear step in which the converter output shaft is kept at constrained standstill, is also provided with a gear step in which all intermediate shafts are out of meshing engagement with the converter output shaft thus placing the converter output shaft in condition for total free wheeling.

In the preferred embodiment of the converter according to the invention, each pump of the hydrostatic drive is arranged in coaxial alignment with, and at the front side of, one of the two respective intermediate shafts of the spur gear mechanism. Preferably, an essential component of the auxiliary drive (for instance the cylinder drum or the piston-controlling tumbling disk in tumbling disk pumps, the cylinder star or the eccentric control cam in pumps of the star type) is directly joined with the adjacent intermediate shaft by a rigid connection or at least so that no rotation relative to the intermediate shaft is possible. Such a connection has the advantage that the intermediate shaft also forms the pump shaft so that additional shafts and bearings can be dispensed with.

There are a large number of possibilities of designing those interior connections between the mechanism components of the converter that determine the type of operation (single-cycle or two-cycle caterpillar operation), and that also determine the share imposed upon the auxiliary drive of the total power transmitted by the converter. A first possibility according to the invention, is to have the converter input shaft drive one of the two intermediate shafts in a permanent, fixed connection, whereas the other intermediate shaft is driven by the auxiliary drive. When a hydraulic positive-displacement drive is used, at least the one pump of the drive that is driven from the converter input shaft is continuously controllable as regards volumetric delivery and, if desired, also as regards its direction of delivery. This design is very simple. The pumps of the auxiliary drive can be directly and rigidly coupled with the intermediate shafts. The converter affords an easy, purely hydraulic maneuvering between highest reverse speed through constrained standstill to the highest speed of the first step forward within a continuous torque-converting control range. The further step-switching likewise occurs in a continuous manner and by genuine torque-converting operation. Only during normal operation, that is, when travelling without change in transmission ratio, are the fixed-ratio spur-gear components in operation. Such a converter has two-cycle operation.

According to another modification, one of the two intermediate shafts is firmly secured with the bridge structure of a distributor gearing arranged in coaxial relation to the intermediate shaft. The converter input shaft is permanently in geared connection with the other intermediate shaft and also with one of the free gear members of the distributor gearing. The third, free member of the distributor gearing is also in connection with the converter input shaft but this connection extends through the auxiliary drive. When using a hydraulic positive-displacement drive, at least the one pump driven from the converter input shaft is controllable as regards volumetric delivery and direction of delivery. This converter also has two-cycle operation.

The term "distributor gearing" is understood to denote a combination of gear members of the type sometimes also called planetary gear or differential gear, depending upon the particular design being used. Such a distributor gearing consists always of two coaxially journalled gears and at least one intermediate or planetary gear simultaneously meshing with the above-mentioned two gears. The intermediate or planetary gears perform a transitory movement by travelling about a pivot pin which in turn is rigidly connected with a mechanism member or "bridge structure" journalled for rotation in coaxial relation to the two first-mentioned gears. The bridge structure and the first-mentioned two gears are called the "free members" of the distributor gearing.

The just-mentioned control of the one intermediate shaft coacting with the distributor gearing forms a drive which subdivides the power being transmitted. In accordance with the number of gear teeth or transmission ratios within the distributor gearing, an accurately predetermined share of the torque to be transmitted from the converter input shaft to the intermediate shaft is transmitted by the constrained meshing operation within the distributor gearing, and only the residual share is transmitted through the variable-ratio auxiliary drive. If the auxiliary drive is a hydraulic positive-displacement drive, then its entire positive and negative control range can be utilized, the terms "positive" and "negative" control range denoting the range in which the driving shaft of the auxiliary drive rotates in the normal (forward) direction and in the reverse direction respectively. In the positive control range, all gear members of the distributor gear operate to transmit "active power," whereas in the negative control range a portion of the driving power supplied to one of the members of the distributor gearing (for instance by the rigidly operating transmission) is passed back to the drive shaft (in the present case to the converter input shaft) in form of the so-called "imaginary power" or "reactive power." The large total transmission range resulting from the negative and positive control ranges of the hydraulic drive, surpasses by a multiple the transmission range required for shifting or for starting from the standstill condition. This makes it possible, by selecting corresponding transmission ratios in the distributor gearing and in the connections of its driven free members (connected with the auxiliary drive and with the converter input shaft), to impose upon the auxiliary drive an only small torque. As a result, the auxiliary drive can be given relatively small dimensions.

According to a further modification of the invention, the converter input shaft is connected with the bridge structure of a coaxially arranged distributor gearing, the two remaining free members of the distributor gearing are connected with the respective two intermediate shafts, and one intermediate shaft is additionally connected through the auxiliary drive with the converter input shaft. When employing a hydraulic positive-displacement drive, at least the one pump driven from the converter input shaft is controllable as to volumetric delivery and direction of delivery.

This arrangement has the effect that during step-changing operation, the two intermediate shafts are simultaneously driven and change their respective speeds in mutually-opposed sense, thus exhibiting single-cycle caterpillar operation. During normal operation, that is as long as no change in steps takes place, both intermediate shafts are always active to transmit power. However, when accelerating the one intermediate shaft from standstill, as well as during standstill, one of the intermediate shafts must revolve at twice the speed of the converter input shaft. This modification has the considerable advantage, as compared with those described above, that a converter with a given number of gears in the spur-gear speed-change mechanism has twice the number of steps as a result of the single-cycle operation. On the other hand, it is a disadvantage that the auxiliary drive must temporarily (namely during step shifting) transmit the entire power of the converter.

Another modification according to the invention is similar to the one last mentioned and represents an improvement relative thereto. According to this further modification, the converter input shaft is connected with a coaxially arranged distributor gearing, the two free members of the distributor gearing are connected with the respective intermediate shaft, and these two intermediate shafts are connected with each other also through the auxiliary drive. If a hydraulic positive-displacement drive is used, at least one of its two pumps is delivery-controllable.

In such a converter, the driving connection of the auxiliary drive with the converter input shaft is eliminated, and the auxiliary drive, during step-changing operation, is called upon to transmit only one half of the converter power. This is so because the distributor gearing, which distributes the converter power onto the two intermediate shafts, drives the one intermediate shaft during the switching interval in which only this one intermediate shaft must transmit the entire power. The proportion of this power which the distributor gearing transmits to the other intermediate shaft then not participating in the power transmission, is then supplied through the auxiliary drive to the other, then active intermediate shaft. This converter also has single-cycle operation.

Relative to the two last-mentioned modifications, it will be recognized that the auxiliary gearing will greatly participate in the power transmission during step-shifting operations and consequently must be given correspondingly large dimensions. Besides, the hydraulic auxiliary gearing, in contrast to converters with two-cycle operation, must be kept running with an appreciable delivery and hence appreciable piston movement, during periods of normal operation, i.e. outside of the step-changing intervals. Such participation in power transmission of the pumps during normal converter operation can be eliminated by having the pumps set to zero delivery during normal operation. However, the invention also involves a converter design which corresponds to the desired single-cycle operation but permits setting the auxiliary drive during normal operation entirely or nearly to standstill, and in which the auxiliary gearing has to participate only to a very small proportion in the transmission of power and is accordingly relieved of wear and can be given relatively small dimensions.

In this modification of the converter according to the invention, each of the two intermediate shafts is connected with the bridge structure of a coaxially arranged distributor gearing. The converter input shaft is connected with another, free member of each of the two distributor gearings; and the remaining third free members of the two distributor gearings are in connection through the auxiliary drive with each other and also with the converter input shaft. The mutual mechanical connection between the third free members is such that they can perform only mutually opposed rotations determined by the auxiliary drive. For this purpose, when using a hydraulic auxiliary gear, at least the one pump driven from the converter input shaft must be controllable as to volumetric delivery and direction of delivery.

For protecting the mechanism from overload as may occur, for instance, due to excessively rapid change in transmission ratio, another feature of the invention resides in inserting two pressure relief valves into the oil circulation passages of the hydraulic drive. Upon occurrence of excessive pressure in one of the two connecting passages, the valve permits the oil to escape into the other connecting passage.

As mentioned above, for minimizing the overall dimensions of the auxiliary drive it is of advantage to give this drive the largest possible control range. To this end, when providing hydraulic positive-displacement drives, both pumps, instead of only one, may be given a controllable design. According to a more specific feature of the invention relating to two interconnected controllable pumps, one of them is controllable over the entire positive and negative delivery ranges whereas the other is controlled by a constrained and thus automatic connection between the control members of both pumps and is adjustable only over a partial range adjacent to the control position of largest volumetric delivery. The constrained control of the latter pump is such that when the fully controllable pump is set for largest delivery the dependently controlled pump is set for smallest delivery, and vice versa.

The novel converters of variable transmission ratio eliminate to a large extent all above-mentioned disadvantages of the conventional spur-gear mechanisms and differ from an ideal, continuously controllable transmission only by the fact that definite transmission steps are active during normal operation. On the other hand, in such normal operation the novel converters operate with the good efficiency of a spur-gear transmission. By virtue of the continuous and positive coupling between converter input shaft and converter output shaft, never interrupted, except occasionally and intentionally for obtaining total free wheeling, a reliable and easy maneuvering of the vehicle is afforded while requiring no particular skill of the driver.

The foregoing objects, advantages and features of the invention will be apparent from the following description of the embodiments of converters according to the invention illustrated by way of example on the accompanying drawings.

In all illustrations, functionally similar components are denoted by the same respective reference numerals. In all figures, the gear shift control means or master control means are not shown in detail because they are not required for explaining and understanding the invention proper and need not differ from those known for such purposes.

According to Fig. 1, the housing 1 of the converter is traversed by the coaxial alignment of a converter input shaft 2 and a converter output shaft 3 (in the following the converter input shaft 2 is briefly referred to as the "CI-shaft"; and the converter output shaft 3 is briefly called the "CO-shaft"). Journalled within the housing 1, in parallel relation to shafts 2 and 3 are two intermediate-gearing shafts 4a and 4b (hereinafter briefly called "G-shafts"). CI-shaft 3 has its left end revolvably guided in a frontal bore of CI-shaft 2. The CO-shaft 3 is further provided with a feather profile or squared portion 5 and can be directly and positively connected with the CI-shaft 2 by means of a claw member 6 of a clutch mounted on CO-shaft 3 and engageable with a claw member 7 which forms part of a displaceable clutch-control sleeve to be operated when a direct drive from shaft 2 to shaft 3 is desired. Each of the two G-shafts 4a and 4b is provided with a squared profile 8 which extends parallel to the shaft axis or along a helical curve. The profile 8 serves to join the G-shaft with a number of spur gears so that these gears cannot rotate relative to the shaft but are axially displaceable relative thereto. These gears, denoted by 9a—10a, 11a—12a, 9b—10b and 11b are rigidly joined together in pairs and are equipped with straight, pitched or helical gear teeth. (Hereinafter these gears are briefly referred to as "G-gears.") The gears 9a and 9b are identical so that they could be exchanged for each other, and this also applies to the gears 10a and 10b, 11a and 11b. Each of the G-gears can be axially displaced, and in this manner can be put into and out of meshing engagement with one of the respective main gears 9, 10, 11 and 12 mounted on CO-shaft 3. That is, each of the G-gears is engageable with one main gear that is denoted by the same reference number. (Hereinafter the main gears 9 to 12 are briefly referred to as "M-gears".)

The transmissions to be formed by the G-gears and M-gears and involving the meshing engagement of one of the gear pairs 9a/9, 10a/10, 11a/11 and 12a/12 operate as the individual gear steps of the torque converter. These transmissions are so graduated that they correspond, from step to step, to a series of powers of a constant value C progressing in integers. In other words, the transmission between two mutually adjacent converter steps always forms a constant ratio C. The transmission to be formed by the meshing engagement of gears 12a and 12 is such that the CI-shaft 2 and the CO-shaft 3 revolve at the same speed and can directly and positively be coupled with each other by the operation of the clutching sleeve 7. The meshing engagements to be formed by the G-gears and the M-gears 9b/9, 10b/10, 11b/11 have their transmission ratios coincident with those of the respective spur gear connections 9a/9, 10a/10, 11a/11. The corresponding additional gear pair 12b/12 is substituted by the direct drive obtained by operation of the clutch sleeve 7; and the spur gear 12b, being thus made superfluous, is omitted in the converter of Fig. 1.

For controlling the G-gear pairs, each of these gears has an annular groove 13 engaged by the gear-shift fork of suitable master control means (not illustrated). Through the gears 14 and 15, the CI-shaft 2 is continuously in driving engagement with the G-shaft 4b.

Located on the left side of the converter is a hydrostatically operating auxiliary drive composed of two pumps. The auxiliary drive shown by way of example is of the tumbling-disk type. Its two pumps comprise respective cylinder drums 16a, 16b which are equipped with several cylinder bores in a circular arrangement. The pump pistons 17 are oil-tightly guided in the cylinder bores and are articulately linked through piston rods with two tumbling disks 18a and 18b so as to be controlled by these disks. The cylinder drums 16a and 16b rotate simultaneously with the respective tumbling disks 18a and 18b. The cylinder bores are provided at their bottom with respective control openings 19. During rotation of the cylinder drums about the axis of the device, the openings 19 alternately register with two control slots 20 for the supply and escape of the working liquid (oil), the slots 20 being machined into the housing wall adjacent to the pumps.

The volumetric delivery of the pump is determined by the stroke length of the pistons and this length depends upon the angular position of the tumbling disk relative to the disk axis. This angular position is fixed as far as the cylinder drum 16a is concerned but is variable for the cylinder drum 16b due to the fact that the control slots 20 are machined into a sliding shoe 21 whose side resting against the housing 1 has a cylindrically convex shape and is in accurate area engagement with the mating, cylindrically concave housing wall. In Fig. 1, the cylinder drum 16b is in the neutral mid-position; that is, the angle of inclination of the cylinder drum relative to the axis of the tumbling disk is equal to zero. However, by virtue of the cylindrical engagement with the housing, the position of the cylinder drum 16b can be displaced by control means (not illustrated in Fig. 1) from the neutral mid-position downward as well as upward to limit positions indicated by dot-and-dash lines and denoted by plus and minus signs respectively. The magnitude of the volumetric delivery (cm.$^3$ per revolution) of the pump depends upon the magnitude of the angle of inclination measured from the zero position; and the direction of delivery depends upon toward which side the cylinder drum is displaced from the zero position. In the following, the angle between the zero position and the plus limit line is called the "positive displacement range," and the angle between zero position and negative limit line is called the "negative displacement range."

Figure 1:
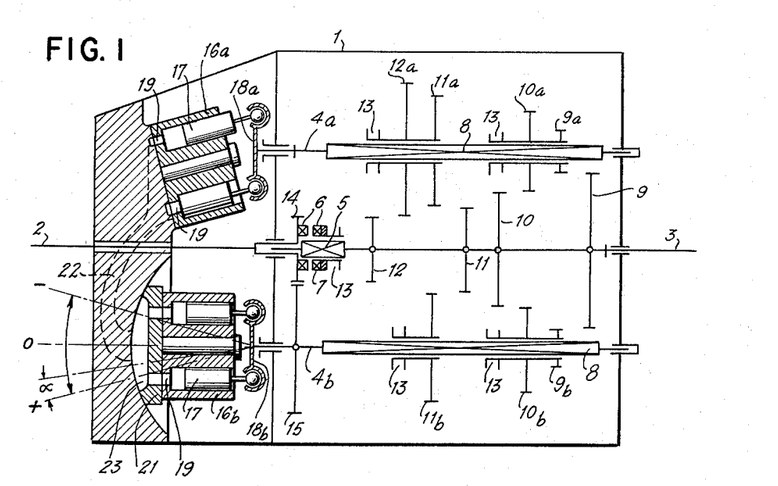
Figs. 1 and 2 show two power converters in longitudinal section.

The two pumps are interconected by two oil passages 22, located one behind the other in Fig. 1, so as to form a closed oil cricualtion system. The passages extend directly from the control slots 20 of the upper pump to the cylindrically concave housing area adjacent to the lower pump. The sliding shoe 21 has two troughs 23 located one behind the other in Fig. 1. The troughs are individually connected with the two control slots 20 of each cylinder and extend in a direction tangential to the cylindrical guiding surface, that is, in the direction of displacement of the sliding shoe 21. In this direction the troughs are sufficiently long so that the oil passages 22, having their ports located within the range of the neutral center axis of the lower pump, are covered in any possible angular position of the pump to maintain the oil circulation regardless of the angular position to which the lower pump may be set.

In the zero or mid-position of the cylinder-drum axis, the piston stroke is zero. As a result, the upper pump, regardless of the instantaneous revolving speed of the lower pump, is constrainedly kept at standstill. With an increasing angular displacement of the lower cylinder-drum axis from the zero position, the revolving speed of the upper pump increases in dependence upon the ratio of the volumetric deliveries of the respective pumps obtaining under each particular control condition.

The operation of the converter according to Fig. 1 is as follows. In the illustrated positions of the G-gears and of the cylinder drum 16b in the lower pump, the upper pump and hence the G-shaft 4a are in the condition of constrained (blocked) standstill. The CI-shaft 2 driven from a motor or other drive, operates the G-shaft 4b through the gear pair 14/15 and thus also drives the tumbling disk 18b of the lower pump continuously with a constant ratio of transmission. The clutch sleeve 7 is in the open position. The CO-shaft 3 is at rest. Since all G-gears are out of meshing engagement, the CO-shaft is in condition for "totally free wheeling," this condition being utilized only if, for instance, a vehicle equipped with this converter, is to be freely movable.

It may be mentioned that relative to the embodiment of Fig. 1 as well as relative to those illustrated in all other figures, it will hereinafter be assumed, for the purpose of explanation, that the converter is built into an automotive vehicle because the requirements to be placed on a vehicle drive are especially well suited for exemplifying the various switching problems than can be met by such converters.

*First switching problem: Starting from free wheeling and switching through all steps into direct drive*

At first, the condition of free wheeling is converted into the condition of constrained standstill of the CO-shaft. This is done by shifting the G-gear 9a into the M-gear 9. In this condition of the converter, the vehicle cannot move even when the brakes are released, because the CO-shaft and hence the driving wheels of the vehicle are completely blocked by the converter. Now, the lower pump, driven from the CI-shaft, is displaced from the zero position into the positive range. As a result, and in accordance with the rate of this displacement, the previously arrested upper pump, being now driven hydraulically, is accelerated until the lower pump has approximately reached "plus" limit position in the positive displacement range. Simultaneously with the upper pump, the G-shaft 4a connected with the pump and also the gears 9a, 9 and the CO-shaft 3 and thus the vehicle are correspondingly and constrainedly accelerated by pure torque-converting operation ($Md_1 \cdot n_1 = Md_2 \cdot n_2$). In the control position of the lower pump thus reached, the G-shaft 4a has the same revolving speed as the G-shaft 4b (upper synchronous speed) so that the G-gear 9b having with M-gear 9 the same transmission ratio as the gear 9a, can be brought into meshing engagement with the M-gear 9. After this is done there exists between the CI-shaft and the CO-shaft a double connection in which both G-shafts participate in transmitting power with the normal transmission ratio of the first gear step of the converter. Consequently, the hydraulically driven G-shaft 4a can now be released. This is done by disengaging the G-gear 9a from the driving connection between CI-shaft 2 and CO-shaft 3. Thereafter the transmission of the entire driving power in the converter is assigned exclusively to the rigidly driven G-shaft 4b, operating in the gear train 2—14—15—4b—9b—9—3. The condition now obtaining is the normal travelling condition of the first converter step. During this condition the auxiliary drive is completely relieved of any load, i.e. the upper pump runs idle. If desired, the auxiliary drive could be put at standstill by causing the master control means of the converter to return the lower pump into the zero position.

For shifting the converter to the second step, corresponding to a higher speed of the CO-shaft, the lower pump is to be moved back from its plus-limit position by the angle α in the direction toward the zero position. This reduces the revolving speed of the upper pump and of the G-shaft 4a driven thereby, until the ratio of the new revolving speed to the previously obtaining upper synchronous speed corresponds to the constant C. This new revolving speed is hereinafter called the "lower synchronous speed." Since the constant value C corresponds to the transmission jump between the individual steps, it is now readily possible to shift the G-gear 10a without impact into meshing engagement with the M-gear 10. After this is done, there exists again a double connection between the two converter shafts through both G-shafts so that, without effect upon the converter output, the G-gear 9b can be shifted out of meshing engagement. Now, the train of power transmission extends from CI-gear 2 only through the hydraulic auxiliary drive to the G-shaft 4a, and thence through gears 10a, 10 to CO-shaft 3. G-shaft 4a as well as the CO-shaft 3 driven thereby can now again be accelerated to the upper synchronous speed by returning the lower pump into the positive limit position. Since during this operation, the two G-shafts revolve at the same speed, it is readily possible to subsequently also bring G-gear 10b into meshing engagement with M-gear 10. After this is done, the double connection through both G-shafts is again established so that both G-shafts contribute to the transmission of power in the second converter step. Consequently, the hydraulically-driven G-shaft 4a can now be released by disengaging G-gear 10a from the driving connection. Thereafter, the transmission of the entire power is assigned to the rigidly driven G-shaft 4b alone. The switching condition now obtaining is the normal travelling condition of the second converter step, in which the auxiliary drive is completely relieved of driving duty and, if desired, could be put at standstill by having the master control means of the converter return the lower pump into zero position.

For progressing to the third step, the lower pump is moved from its plus-limit position through the angle α toward the zero position. This lowers the speed of the upper pump and of the G-shaft 4a driven thereby, until the ratio of the new revolving speed of the upper synchronous speed corresponds to the constant C. Then, the lower synchronous speed is again established, and it is possible, for the reasons already explained, to now place the G-gear 11a without impact into meshing engagement with the M-gear 11. Subsequent to this shifting operation, there exists again the double connection through both G-shafts so that, without effect upon the output of the converter, the G-gear 10b can be disengaged. After this is done, the G-shaft 4a, which now takes alone care of transmitting power, can again be accelerated up to the upper synchronous speed by returning the lower pump into the positive limit position. Since during this operation both G-shafts rotate at the same speed, the G-gear 11b can subsequently be brought into meshing engagement with the M-gear 11, thus again establishing the double connection wherein the two G-shafts participate in the power transmission with the transmission ratio of the third converter step. For that reason, and also as explained, the hydraulically-driven G-shaft 4a can be released from the driving connection CI-shaft 2 and CO-shaft 3 by disengaging the G-gear 11a. Thereafter the transmission of the entire converter power is assigned exclusively to the rigidly driven G-shaft 4b. The converter condition now obtaining is the normal travelling condition of the third converter step, the auxiliary drive being completely relieved of duty so that it may be arrested if desired.

For switching to the fourth converter step, the lower pump is returned from its plus-limit position through the angle α in the direction toward the zero position. This reduces the revolving speed of the upper pump and of the G-shaft 4a driven thereby until the ratio of the new revolving speed to the upper synchronous speed corresponds to the constant C. In this manner, the lower synchronous speed is again attained and, for the reasons explained, it is now possible to place the G-gear 12a without impact into meshing engagement with the M-gear 12.

For progressing to the fourth step, the lower pump is again displaced from its limit position through the angle α toward the zero position, thus lowering the revolving speed of the upper pump and of the G-shaft 4a driven thereby until the ratio of the new revolving speed to the upper synchronous speed previously obtaining corresponds to the constant C. Now the lower synchronous speed is again attained, and the G-gear 12a is to be shifted into meshing engagement with the M-gear 12. Thereafter, there exists again the double connection through both G-shafts so that the G-gear 11b can be disengaged. Once this is done, the G-shaft 4a, which now transmits the entire power, is again accelerated to the upper forward speed, together with the CO-shaft 3 driven thereby. This acceleration is obtained by returning the lower pump into the positive limit position. Since the two G-shafts are revolving at the same speed, it is now readily possible to connect the CI-shaft 2 directly with the CO-shaft 3 by operating the clutch sleeve 7 (instead of the omitted G-gear 12b). In this manner, a double connection is again established so that the hydraulically driven G-shaft 4a can be released by disengaging the G-gear 12a, whereafter the entire converter power is transmitted through the clutch sleeve 7. The condition now obtaining is the normal travelling condition of the fourth step or direct drive, the auxiliary drive and both G-shafts being completely relieved of duty so that the auxiliary drive, if desired, may be put at standstill.

*Second switching problem: Shifting from direct operation down to constrained standstill*

Since the switching operations when switching in the downward direction (i.e., in the direction of decreasing speed of the CO-shaft) are similar to those described with reference to the switching toward higher speeds described above, the individual switching operations are indicated in the following only by an abbreviated tabulation.

(A) (1) Hydraulic regulation of G-shaft 4a to upper synchronous speed.
(2) Establish a double connection by shifting G-gear 12a into mesh with M-gear 12.
(3) Disengage the clutch sleeve 7.
(4) Decelerate G-shaft 4a hydraulically to lower synchronous speed.
(5) Establish double connection by engaging G-gear 11b with M-gear 11.

(B) (1) Accelerate G-shaft 4a hydraulically to upper synchronous speed.
(2) Establish double connection by engaging G-gear 11a.
(3) Disengage G-gear 11b.
(4) Decelerate G-shaft 4a hydraulically to lower forward speed.
(5) Establish double connection by engaging G-gear 10b.
(6) Disengage G-gear 11a. Now the converter operates in the second step.

(C) (1) Accelerate G-shaft 4a hydraulically to upper synchronous speed.
(2) Establish double connection by engaging G-gear 10a.
(3) Disengage G-gear 10b.
(4) Decelerate G-shaft 4a hydraulically to lower synchronous speed.
(5) Establish double connection by engaging G-gear 9b.
(6) Disengage G-gear 10a. Now the converter operates in the first step.

(D) (1) Accelerate G-shaft 4a hydraulically to upper synchronous speed.
(2) Establish double connection by engaging G-gear 9a.

(3) Disengage G-gear 9b.
(4) Decelerate G-shaft 4a hydraulically down to constrained standstill.

If there after the G-gear 9a would also be disengaged, the condition of total free wheeling were attained. However, as mentioned above, the condition of constrained standstill is the normal condition of rest of the converter.

*Third switching problem: Accelerating from blocked standstill in reverse operation, and subsequently decelerating down to blocked standstill and starting in the first converter step forward*

For accelerating CO-shaft 3 from blocked standstill in the reverse direction, it is only necessary to regulate the lower pump, driven from the CI-shaft, from the zero position into the negative range of displacement. Then, the upper pump is hydraulically accelerated in a direction of rotation opposed to the normal direction. Simultaneously, the G-shaft 4a and also, through the engaged G-gear 9a, the CO-shaft 3 are accelerated in the reverse direction. The speed of reverse revolution can be accelerated, up to the maximum attainable in the first forward step, by displacing the lower pump up to the negative limit position indicated by the dot and dash line and denoted by the minus sign. For reducing the speed of reverse rotation down to blocked standstill, the lower pump need only be shifted back into the zero position. An immediately subsequent further displacement of this pump in the direction of the positive displacement range again results in a corresponding acceleration of CO-shaft 3 and hence of the vehicle in the normal direction of travel.

It follows taht the converter affords an extremely convenient maneuvering of the vehicle. Especially important for this purpose is the fact that the rigidly constrained driving connection, with the exception of the selectively obtainable condition of total free wheeling, is never interrupted by the double connection occurring during each transition between speed steps. For that reason, maneuvering of the vehicle as well as gear shifting on an upward or downward grade or in the field can be effected by anybody without danger and without requiring particular skill. The uninterrupted driving connection obtaining with each selected gear condition is particularly favorable with vehicles having large travel resistance (caterpillar vehicles), tractors or heavy-load trucks. Last, not least, the converter is self-braking so that the brakes of a vehicle equipped with such a converter are seldom in use and hence subjected to only little wear.

From a study of the individual switching operations required for a shift between gear steps, it will be recognized that each gear shift operation is composed of two stages of synchronous operation and two mutually opposed changes in speed or transmission ratio brought about by the auxiliary drive. During synchronous operation, the gear shift proper will take place and, by virtue of the temporary double connection, the rigidly constrained connection between CI-shaft and CO-shaft is always maintained. If each change in transmission ratio of the auxiliary drive is considered a "cycle," then the above-described converter has two-cycle operation, one cycle resulting in acceleration, for instance, of the auxiliary-drive output shaft and of the G-shaft controlled thereby, whereas during the next cycle the auxiliary-drive output shaft and the G-shaft driven thereby again decelerate down to the original speed obtaining prior to the first cycle. The switching operations toward high speed differ from those toward low speed only by the fact that in one case the connection of the CO-shaft with the G-shaft whose revolving speed is controlled by the auxiliary drive, occurs during the first cycle, whereas in the other case this connection occurs in the second cycle. Besides, it is a particularity of the two-cycle operation that one of the G-shafts is driven from the CI-shaft continuously with a fixed transmission ratio whereas only the other G-shaft is driven and speed-controlled by the auxiliary drive.

Figure 2:
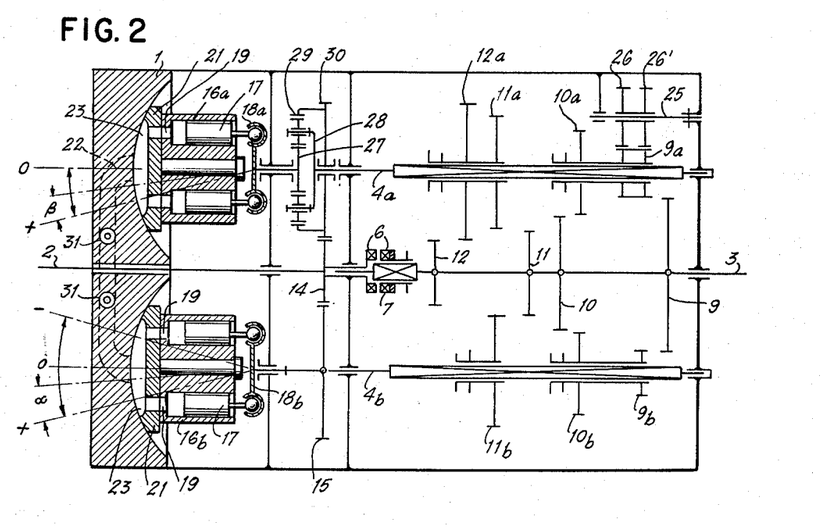
Figure 3:
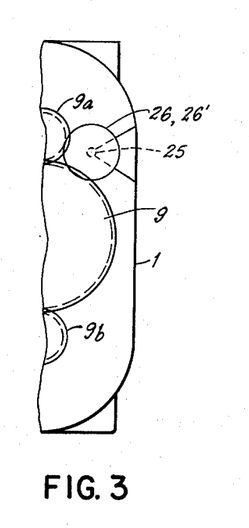
Fig. 3 is a partial cross-sectional view of a converter according to Fig. 1 or 2.

Fig. 2 illustrates another embodiment of a converter of variable transmission ratio. Mounted within the housing 1 of the converter is a spur-gear speed-change gearing which, essentially, is similar to the one shown in Fig. 1 and whose individual components are denoted by the same reference characters respectively. A difference resides in the fact that the gearing according to Fig. 2 is equipped with a reversing portion formed of spur gears. This portion comprises within housing 1 a shaft 25 on which two spur gears 26 and 26', rigidly connected with each other, are revolvable and axially displaceable. The G-gear 9a is given a particularly large width so that its meshing engagement with gears 26, 26' is maintained when the latter gears are displaced on their shaft 25 entirely to the right, when G-gear 9a is displaced from the illustrated position toward the right, and also when gears 26, 26' as well as G-gear 9a are displaced toward the right. The position of shaft 25 within housing 1 is such that the spur gears 26 and 26', simultaneously or individually, can be placed into meshing engagement with G-gear 9a as well as with M-gear 9 (see Fig. 3). This converter arrangement affords the following switching operations:

a. G-gear 9a may be displaced toward the right. This corresponds to the normal converter condition for starting in the first step.

b. Only gears 26 and 26' may be displaced toward the right. Then the G-gear 9a drives gear 26', and gear 26 joined with gear 26' drives the M-gear 9. With this switching condition, the M-gear is driven in the opposite direction, i.e. for reverse travel.

c. When the G-gear 9a as well as gears 26 and 26' are displaced toward the right, then there exists the positive double connection required for gear shifting from the first step forward to the first step reverse and vice versa.

The spur gears 26 and 26' may be combined to a single spur gear with a single row of teeth extending over the entire combined width. The subdivision into two equal gears 26, 26' was chosen only in order to permit the gear-shift fork, for shifting these gears, to enter into the gap between the two individual gear members.

Like in the converter of Fig. 1, the lower G-shaft 4b is continuously driven at a constant transmission ratio from the CI-shaft 2 through the spur gears 14, 15. Also like in the embodiment of Fig. 1, the tumbling disk 18b is rigidly connected with the G-shaft 4b so that the lower pump will continuously rotate simultaneously. The lower pump drives the upper pump hydraulically, the upper pump being aligned with the G-shaft 4a. The tumbling disk 18a of the upper pump is connected with the sun gear 27 of a distributor gearing. This gearing has planet gears mounted on a bridge structure 28 which is rigidly connected with the G-shaft 4a. The orbit gear 29 is driven from gear 14 of CI-shaft 2 through a gear 30 connected with the orbit gear. The upper pump is connected with the lower pump through oil passages 22 in a closed circulation system and is positionally controllable in the same manner as the lower pump of Figs. 1 and 2. The controllable design of the upper pump in the converter of Fig. 2 has the purpose of enlarging the control range of the auxiliary drive. If such a wide control range is not required, the upper pump can be given a constant angle of inclination of its cylinder drum 16a in the same manner as described with reference to Fig. 1.

In the illustrated positions of the individual components of the converter according to Fig. 2, the CO-shaft 3 is in condition of total free wheeling. The lower pump as well as the upper pump is in position for zero delivery. With this setting of the two pumps the operation of the converter is as follows:

When the upper pump is set shifted into position for full delivery in the positive range (i.e. when the cylinder-drum axis is placed into coincidence with the plus limit line), then the sun gear 27 can be accelerated from standstill in one or the other direction of rotation up to the available maximum speed by displacing the lower pump through the available full positive or negative range of displacement. This reversible rotation of the sun gear 27 at variable speed, in cooperation with the orbit gear 29 driven from the CI-shaft 2, has the effect of producing a variable revolving speed of the G-shaft 4a. By a suitable choice of the driving transmission ratio of the spur gears 14/30, the orbit gear 29 and the sun gear 27, one can even have the G-shaft 4a perform a reverse rotation when the lower pump is placed into a partial range of the available total range of displacement adjacent to the negative limit position, and that a purely hydraulically produced reverse rotation of the CO-shaft 3 will occur, just as is the case in the embodiment of Fig. 1, when the G-gear 9a is in meshing engagement. However, in the embodiment of Fig. 2, no advantage is taken of this available possibility. Instead, the spur-gear speed-change gearing is equipped with a reversing portion. The just-mentioned transmission ratios are so selected that the G-shaft 4a is at standstill in the neighborhood of the negative limit position of the lower pump. When G-gear 9a is in meshing engagement, the CO-shaft is in constrained standstill condition. When the angle of inclination of the lower pump, i.e. of the cylinder drum 16b, is being displaced for instance into the neighborhood of the positive limit condition, then the G-shaft 4a accelerates from standstill up to the speed of the G-shaft 4b, i.e. up to the upper synchronous speed. A reduction of the angle of inclination by the anble α (see Fig. 2) results in deceleration of the G-shaft 4a down to the lower synchronous speed. The operation of the converter can best be traced with reference to the examples of switching problems described below.

*First switching problem: Starting from constrained standstill (G-gear 9a meshing with M-gear 9, upper pump in positive limit position, lower pump in negative limit position). Switching upward to direct drive*

Since the one G-shaft (4b) is continuously driven from the CI-shaft 2 at a constant transmission ratio, the converter operates in two-cycle operation like the one described with reference to Fig. 1. In view of the detailed description given above relative to Fig. 1, the following description of the individual switching operations is abbreviated and is limited to the two cycles occurring during the individual gear shifting intervals.

First cycle: Reduce the speed of G-shaft 4a to the lower synchronous speed. Engage the G-gear 9a. Disengage spur gear 26' from M-gear 9. (These operations of the first cycle are already completed in the constrained standstill condition.)

Second cycle: Accelerate G-shaft 4a to the upper synchronous speed. Engage G-gear 9b. Disengage G-gear 9a thereby relieving the G-shaft 4a. Now the converter is set to the normal condition of the first step forward.

First cycle: Decelerate G-shaft 4a to lower synchronous speed. Engage G-gear 10a. Disengage G-gear 9b.

Second cycle: Accelerate G-shaft 4a to upper synchronous speed. Engage G-gear 10b. Disengage G-gear 10a whereby G-shaft 4a is relieved. Now the converter is in the normal condition of the second step forward.

First cycle: Decelerate G-shaft 4a to lower synchronous speed. Engage G-gear 11a. Disengage G-gear 10b.

Second cycle: Accelerate G-shaft 4a to upper synchronous speed. Engage G-gear 11b. Disengage G-gear 11a thereby relieving the G-shaft 4a. Now the converter is in normal condition of the third step forward.

First cycle: Decelerate G-shaft 4a to the lower synchronous speed. Engage G-gear 12a. Disengage G-gear 11b.

Second cycle: Accelerate G-shaft 4a to the upper syncronous speed. Engage clutch sleeve 7. Disengage G-gear 12a whereby the G-shaft 4a is relieved. Now the converter is set for direct forward drive.

For relieving the hydraulic auxiliary drive it is preferable that the master control means (omitted in Fig. 2) for controlling the individual switching operations of the converter be given such a design that during the period of time in which only a rigid transmission, i.e. spur gear transmission, is effective, the lower pump driven from the CI-shaft is automatically regulated down to zero delivery. In the most favorable case, the regulating range of the lower pump, characterized by the angle α and comprising the speed range between upper and lower synchronous speeds, may be made identical with the entire positive displacement range of the pump.

*Second switching problem: Shifting from direct drive back to constrained standstill*

This operation is performed in exactly the same manner as with the converter according to Fig. 1 so that reference can be had to the corresponding portion of the foregoing description.

*Third switching problem: Maneuvering from first step forward through constrained standstill to reverse travel, and vice versa*

During such maneuvering, the switching conditions described above as items a, b and c will take place. These operations distribute themselves onto the individual cycles as follows:

First cycle: Accelerate G-shaft 4 to the upper synchronous speed. Engage G-gear 9a. Disengage G-gear 9b.

Second cycle: Decelerate G-shaft 4a and thus also the CO-shaft 3 down to standstill (adjustment of the pump to the negative limit position). This standstill condition simultaneously establishes constrained standstill of CO-shaft 3 due to the hydraulic blocking of G-shaft 4a.

First cycle: If the switching operations occurring with the other gear-shift changes were performed completely, the condition of constrained standstill would correspond to the lower synchronous speed and, at the end of the second cycle last described, the spur gear 26' would have to be placed in engagement with the M-gear 9 whereas the G-gear 9a would have to be disengaged. Then there would still exist a constrained standstill of the CO-shaft 3. However, the just-mentioned switching operations are supplementarily performed at the beginning of the first cycle here being described, in order to initiate reverse operation. When this is done, the CO-shaft 3, utilizing the entire negative and adjacent positive displacement range of the lower pump, can be accelerated, from constrained standstill up to a maximum speed corresponding to the first step forward, by purely hydraulic means and by genuine converter performance in reverse operation and can again be decelerated down to standstill.

Second cycle: This cycle is obviated because the reverse gearing on the G-shaft 4b, required for a double connection, is missing. The reverse operation cannot be performed without the cooperation of the auxiliary drive.

First cycle: Reduction in speed with subsequent standstill for terminating the reverse travel, subsequent engaging of G-gear 9a and disengaging of spur gear 26'. These operations already correspond to the first cycle required for establishing the first step forward (see column 19).

Second cycle: Increase the speed of G-shaft 4a to the upper synchronous speed. Engage G-gear 9b. Disengage G-gear 9a. Now the normal first step forward is again established. The travelling and maneuvering qualities obtainable with the converter, are similar to those described with reference to the converter according to Fig. 1.

Figure 4:
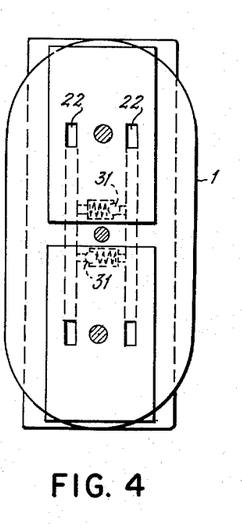
Fig. 4 shows another cross-section of such a converter.

Fig. 2 further illustrates a possibility of protecting the hydraulic auxiliary drive from overload, this possibility being applicable with all other converters according to the invention. The two oil passages 22 (see also Fig. 4) are connected by two opposingly acting pressure limit valves 31 in such a manner that the oil from each passage subjected to excessive pressure can escape into the other passage.

The possibility of controlling or regulating the upper pump in the converter according to Fig. 2 can be utilized, if desired, for establishing the total free wheeling condition of the CO-shaft 3 by setting the upper pump to the zero position (as shown in Fig. 2). In this case, the G-gear 9a may remain in meshing engagement during each type of standstill of the CO-shaft 3. Besides, the upper pump can be regulated, during each gear-shifting operation, from the positive limit position through an angle $\beta$ in the direction toward the zero position, and vice versa. This possibility of operation is described more in detail below with reference to the examples shown in Figs. 5, 6, 7.

It may be added that the converter, aside from operating with normal spur-gear transmission components having the best efficiency, may operate at certain intermediate transmission ratios also with good efficiency while simultaneously reducing the duty imposed upon the hydraulic auxiliary drive. These intermediate transmission rations result with each normal setting of the converter, when the lower pump is set at rest in zero-delivery position thus placing the upper pump and the sun gear 27 connected therewith to standstill. This applies for all converter designs according to the invention which, like in the present embodiment of Fig. 2 or in the embodiments of Figs. 5 and 6, are equipped with a single distributor gearing, or which according to the embodiment of Fig. 7 have two distributor gearings.

Figure 5:
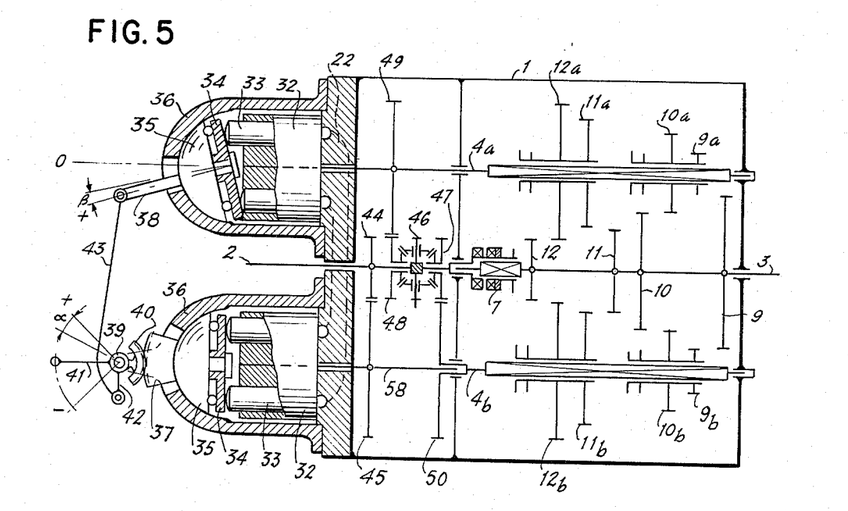
Figs. 5, 6 and 7 illustrates three other embodiments of a converter also by respective longitudinal sections.
Figure 6:
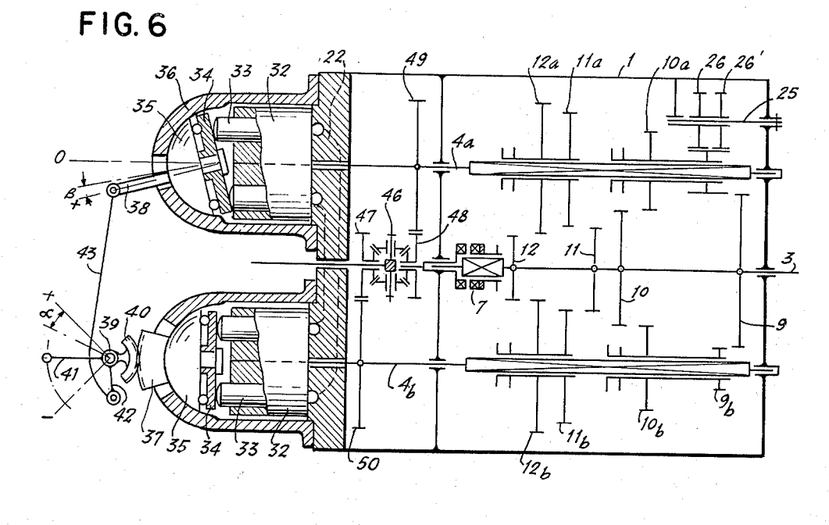

In the embodiment illustrated in Fig. 5, the spur-gear speed-change means are provided with the G-gear 12b on G-shaft 4b not used in the embodiments previously described. Otherwise, the converter of Fig. 5 is essentially similar to that of Fig. 1 so that a repetition of the detailed description can be dispensed with. The auxiliary drive, like in the embodiments already described, is composed of two pumps which, however, are fundamentally a kinematic inversion of the pumps illustrated in the preceding figures. Indeed, the functioning of a converter according to the invention is not dependent upon any particular type of the hydraulic drive means.

In the pumps according to Fig. 5, the cylinder drums 32 are coaxially aligned with the respective G-shafts, whereas each tumbling disk 34 for controlling the pump pistons 33 is rotatably mounted on a segment 35 whose angle of inclination can be varied. The bell-shaped pump housing 36 of each pump has a flange mounted on the front side of the converter housing 1 and can be readily removed for inspection of the interior parts of the pump. The tiltable segment 35 of the lower pump is provided with a gear segment 37. The tiltable segment 35 of the upper pump is provided with a lever 38. The gear segment 37 is in meshing engagement with a gear segment 40 mounted on a stationary shaft 39. Firmly connected with the hub of gear segment 40 is a manually controllable lever 41 pointing toward the left and also an arm 42 extending downwardly. The arm 42 and the lever 38 are articulately interconnected by a linking rod 43.

The dot-and-dash lines, denoted by a plus sign and a minus sign respectively, indicate the limit positions of the control lever 41 which is illustrated in the neutral zero position. The limit lines also indicate the limits of the positive and negative ranges of displacement of the inclination to which the tumbling disks may be set, corresponding to the limits of volumetric delivery of the pumps. The above-mentioned connection between the tiltable segments 35 of the two pumps has the effect that with an increasing volumetric delivery of the lower pump, regardless of the direction of delivery, the volumetric delivery of the upper pump will decline. The regulating travel of the control lever 41 from the zero position to one of the limit positions corresponds to an angle of displacement of the lever 38 equal to $\beta$. This arrangement has the result of increasing the range of displacement obtainable with the hydraulic auxiliary drive. In accordance with the other embodiments, the two pumps are interconnected to form a hydraulic circulation by means of oil passages 22 connected with, or cast into, the wall or the converter housing 1.

The CI-shaft 2 is coaxially aligned with the CO-shaft 3 and drives the lower pump through spur gears 44 and 45. The CI-shaft 2 is firmly connected with the bridge structure 46 of a distributor gearing composed of bevel gears. Two spur gears 47, 48 are firmly connected with the two planetary members of the distributor gearing and are continuously in meshing engagement with respective spur gears 49 and 50 secured to G-shafts 4a and 4b respectively. The cylinder drum 32 of the upper pump is directly connected with G-shaft 4a. The cylinder drum 32 of the lower pump has its own shaft 58 with which the drum is rigidly connected. Mounted on shaft 58 is the spur gear 45. The right-hand end of shaft 58 is journalled and guided in a frontal bore of the G-shaft 4b.

The distributor gearing has the effect that, while both G-shafts are driven from the CI-shaft 2, the G-shafts may have respectively different speeds of revolution. Any decline in speed of the one G-shaft manifests itself in the same measure as an increase in speed of the other G-shaft. Now, the speed ratio of the two G-shafts can be controlled by regulating the lower pump so that when the lower pump, as illustrated, is in the zero position, the G-shaft 4a is at rest or, by displacement of the pump from the zero position, is accelerated in a stepless manner in one or the other sense of rotation, depending upon whether the displacement is positive or negative. G-shaft 4a has maximum speed when the pump is in the limit position. By virtue of the action of the distributor gearing, the G-shaft 4b revolves at twice the revolving speed in normal direction of rotation when the G-shaft 4a is at rest. When G-shaft 4a is revolving in normal direction at maximum speed, then the G-shaft 4b rotates just so much more slowly than the G-shaft 4a that the speed ratio is in accordance with the constant ratio C. Then the lower pump is located in the positive limit position. When the volumetric delivery of the pump is lowered, then the speed of the G-shaft 4a is also lowered; and there is a pump position in which the two G-shafts revolve at the same speed. With a further reduction in pump delivery, a position will be reached in which G-shaft 4b runs just so much faster than G-shaft 4a that the respective speeds form the reciprocal value of the ratio C. When the volumetric delivery of the pump is further reduced the speed of the G-shaft 4a is likewise reduced a further extent. When the pump is in the zero position, G-shaft 4a is at rest and then commences to accelerate in the reverse direction corresponding to any further pump displacement in the direction toward the limit position of the negative displacement range, until a maximum reverse speed of shaft 4a is reached.

The operation of the above-described converter will be apparent from the following examples of switching problems.

*First switching problem: Starting from total free wheeling with the lower pump in position for zero delivery (corresponding to the positions of the components shown in Fig. 5), and passing through all steps up to direct drive*

Since the G-shaft 4a and the CO-shaft 3 are at standstill, G-gear 9a runs in the same direction as M-gear 9 and hence can be shifted into meshing engagement. This establishes constrained standstill condition for the vehicle.

Now the pump is displaced in the positive direction with the result of increasing the speed of G-shaft 4a and CO-shaft 3 up to the point where this speed is equal to the speed of the G-shaft 4b. Now G-gear 9b runs in the same direction and at the same speed as M-gear 9 and can be shifted into meshing engagement. This establishes the double connection between CI-shaft and CO-shaft through both G-shafts. The gear condition thus reached corresponds to the normal operation of the converter in first step.

Now G-gear 9a is disengaged. The speed of G-shaft 4a is hydraulically lowered, and the speeds of G-shaft 4b and CI-shaft 3 are simultaneously increased by the action of the distributor gearing, until the respective speeds of the G-shafts form the ratio C. This results in G-gear 10a running at the proper speed to permit placing this gear into meshing engagement. The double connection now existing between CI-shaft and CO-shaft through the two G-shafts corresponds to the normal operation of the converter in second step.

Now G-gear 9b is disengaged, and the speed of the G-shaft 4a including the CO-shaft 3 is increased up to synchronism with G-shaft 4b and G-gear 10b. G-gear 10b can now be placed into meshing engagement. The double connection now existing between CI-shaft and CO-shaft corresponds to the normal third-step operation.

Now G-gear 10a is disengaged and the speed of the G-shaft 4a is lowered whereas the speed of the G-shaft 4b is increased to the same degree until the respective speeds of the two G-shafts form the ratio C. As a result, G-gear 11a is placed in synchronism and can be shifted into meshing engagement. The resulting double connection between CI-shaft and CO-shaft corresponds to normal fourth-step operation.

Now G-gear 10b is disengaged. The speed of G-shaft 4a and CO-shaft 3 is increased until G-shaft 4a and 4b run synchronous. G-gear 11b can now be shifted into meshing engagement. The resulting double connection between CI-shaft and CO-shaft corresponds to normal fifth-step operation.

Now G-gear 11a is disengaged and the speed of the G-shaft 4a is lowered whereas the speed of the G-shaft 4b is simultaneously increased until the respective speeds of the two G-shafts form the ratio C. This establishes synchronism at G-gear 12a so that the latter can be shifted into meshing engagement. The resulting double connection between CI-shaft and CO-shaft corresponds to normal converter operation in the sixth step.

Now G-gear 11b is disengaged and the speed of the G-shaft 4a and CO-shaft 3 is increased up to equality of speed with G-shaft 4b and hence synchronous run of G-gear 12b is obtained. G-gear 12b is now shifted into meshing engagement. The resulting double connection between CI-shaft and CO-shaft corresponds to normal converter operation in the seventh step.

Now G-gear 12a is disengaged and the speed of G-shaft 4a and G-shaft 4b is increased until the respective speeds of the G-shafts form the ratio C. This establishes synchronous run of the clutch sleeve 7 so that the sleeve can be shifted into clutching engagement. The double connection thus established between CI-shaft and CO-shaft corresponds to normal operation of the converter in the eighth or direct-drive step.

*Second switching problem: Switching down from direct drive to total free wheeling. Presented in abbreviated tabulated form*

Disengage clutch sleeve 7. Accelerate G-shaft 4a up to synchronism at G-gear 12a. Engage G-gear 12a to obtain double connection in the seventh step.

Disengage G-gear 12b. Decelerate G-shaft 4a down to synchronism at G-gear 11b. Engage G-gear 11b to obtain double connection in the sixth step.

Disengage G-gear 12a. Accelerate G-shaft 4a up to synchronism at G-gear 11a. Engage G-gear 11a to establish double connection in the fifth step.

Disengage G-gear 11b. Decelerate G-shaft 4a down to synchronism at G-gear 10b. Engage G-gear 10b to obtain double connection in the fourth step.

Disengage G-gear 11a. Accelerate G-shaft 4a up to synchronism at G-gear 10a. Engage G-gear 10a to obtain double connection in the third step.

Disengage G-gear 10b. Decelerate G-shaft 4a down to synchronism at G-gear 9b. Engage G-gear 9b to obtain double connection in the second step.

Disengage G-gear 10a. Accelerate G-shaft 4a up to synchronism at G-gear 9a. Engage G-gear 9a to obtain double connection in the first step.

Disengage G-gear 9b. Decelerate G-shaft 4a to standstill. This results in constrained standstill of the vehicle.

Disengage G-gear 9a. This results in total free wheeling.

*Third switching problem: Maneuvering between forward and reverse direction of rotation of CO-shaft 3*

Such maneuvering, operating with genuine torque-converter performance only, is effected, with G-gear 9a in meshing position, by a corresponding control of the pumps within the positive and negative ranges of displacement. Consequently, such maneuvering from the condition of constrained standstill does not require the shifting of any G-gears.

It is conspicuous that this converter, although its spur-gear speed-change mechanism differs from that of Fig. 1 only by the added G-gear 12b, has as many as eight forward steps, and that the number of G-gears to the number of steps has the very favorable ratio of 3:2. Moreover, each change between steps requires only a single change in revolving speed to be effected by the auxiliary drive so that this converter has single-cycle performance. The auxiliary drive is completely relieved of duty during normal operation in any of the available steps of transmission.

The embodiment illustrated in Fig. 6 differs from that of Fig. 5 only with respect to the following features. The particular drive for the lower pump through the spur gears 44, 45 is omitted. The cylinder drums 32 of both pumps are directly and rigidly connected with the respective G-shaft aligned with the pumps. The spur-gear speed-change gearing is provided with a reversing portion whose design corresponds exactly to the one shown in Fig. 2 and described above. The gear-shifting operation when maneuvering from first step forward through constrained standstill condition to reverse travel and vice versa corresponds exactly to the operation of the converter according to Fig. 2; and the switching between individual converter steps is effected in the same manner as described in detail with reference to the converter shown in Fig. 5. It is also possible to place the G-shaft 4a into constrained standstill condition with the aid of the lower pump, and to thereafter, in genuine converter operation, change the speed of G-shaft 4a periodically to the upper and lower synchronous speeds for the purpose of initiating the shifting between the normal speed steps. The upper synchronous speed corresponds to the speed-equality condition of the two G-shafts. The lower forward speed is effective when the respective speeds of the two G-shafts have the ratio C.

In comparison with the converter according to Fig. 5, the one shown in Fig. 6 is not only simplified with respect to the G-shaft drive, but has also the advantage that during shifting from one to another step the auxiliary drive is loaded only with one-half of the G-shaft torque and hence can be given smaller dimensions. The converter according to Fig. 6 operates with single-cycle performance and possesses eight forward steps and one reverse step.

Figure 7:
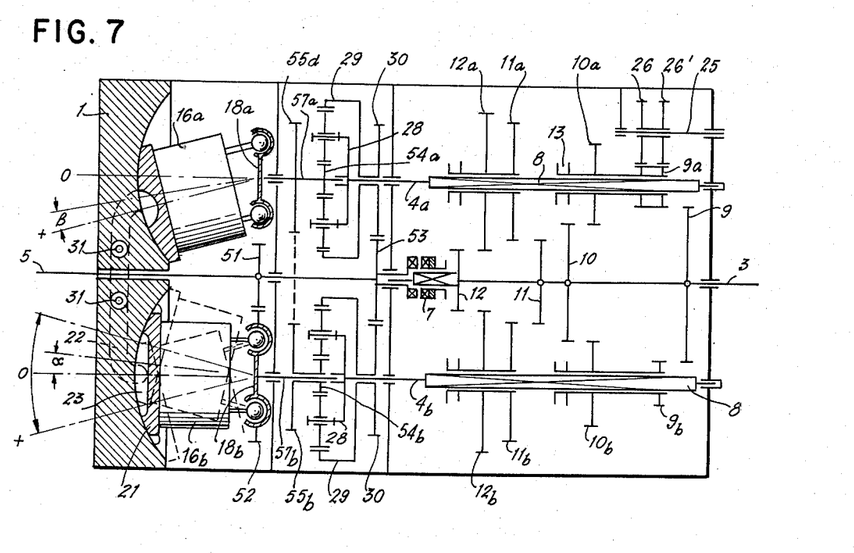

The embodiment illustrated in Fig. 7 is equipped with a spur-gear speed-change mechanism corresponding exactly to that of the converter shown in Fig. 6. That is, the converter of Fig. 7 possesses an additional, built-in reverse gearing portion whose details have been described above with reference to Fig. 2. Also corresponding to the embodiment of Fig. 2, the auxiliary drive comprises two pumps with tiltable cylinder drums. The lower pump is adjustable over the entire positive and negative displacement ranges. In contrast, the upper pump is controlled only in constrained dependence upon the setting of the lower pump, and only within a partial range denoted by β which is adjacent to the positive limit position. The cylinder drum of the lower pump is shown in the neutral zero position. The positive and negative limit positions are indicated by broken lines. The details required for interconnecting the displaceable control members are not shown in Fig. 7, they may be functionally similar to those shown in the embodiments of Figs. 5 and 6.

The CI-shaft and the lower pump are interconnected for a fixed transmission ratio by means of a spur gear 51 which is secured to the CI-shaft and directly meshes with a spur gearing 52 on the tumbling disk 18b. Another spur gear 53 secured to the CI-shaft is simultaneously effective to drive at a fixed transmission ratio, through gears 30, the two orbit gears 29 of two respective distributor gearings. The orbit gears 29 are journalled on the two respective G-shafts. The planetary gear members of the two distributor gearings are journalled on respective bridge structures 28 which are firmly connected with the respective G-shafts. The sun gears 54a and 54b are connected with respective spur gears 55a and 55b and, through the latter gears, are connected with intermediate gears 56 in such a manner that the two sun gears can rotate in mutually opposed directions only. The intermediate gears 56 are journalled on the wall of the converter housing 1.

Figure 8:
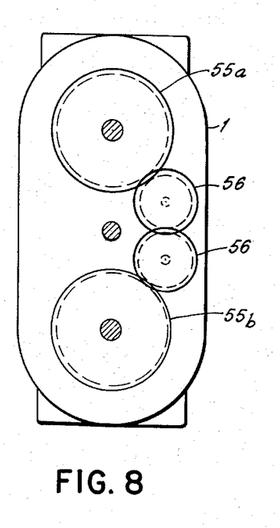
Fig. 8 shows a converter according to Fig. 5, 6 or 7 in front view.

The oil passages 22 which interconnect the two pumps are provided with pressure-relief valves 31 as already mentioned above. The tumbling-disk shaft 57a of the upper pump has its left end journalled in a bearing stationarily connected with the converter housing 1. The right end of shaft 57a is journalled in a frontal bore of G-shaft 4a and is firmly connected with spur gear 55a and with sun gear 54a. The tumbling-disk shaft 57b of the lower pump has one end journalled in fixed relation to the housing 1, whereas the right end is revolvably mounted and guided in a frontal bore of G-shaft 4b. However, in contrast to the upper assembly, the sun gear 54b is firmly connected only with spur gear 55b, while both together are revolvably journalled on the tumbling-disk shaft 57b. The gear connection formed by the intermediate gears 56 between the two spur gears 55a and 55b is indicated in Fig. 7 only by a broken line, but is fully apparent from Fig. 8.

When the lower pump is in zero position (shown in Fig. 7 by full lines), then the upper pump is hydraulically kept in constrained standstill condition. Consequently the two sun gears of the respective distributor gearings are also at rest. The driven CI-shaft 2 is effective in this case to drive both G-shafts at the same speed positively, i.e. in the normal dierction of rotation. If now the lower pump is displaced from the zero position in the direction toward the negative range of displacement, then the sun gear 54a is placed in rotation by G-shaft 4a in a direction opposed to the rotation of the upper pump. Driven by the intermediate gears 56, the sun gear 54b rotates, at the same speed as the sun gear 54a, in the same direction of rotation as the G-shaft 4b. As a result, the speed of G-shaft 4a is reduced whereas the speed of G-shaft 4b is increased to the same extent. With a sufficient pump displacement (approximately in the vicinity of the negative limit position), the G-shaft 4a ultimately is placed into constrained standstill condition, and the G-shaft 4b then rotates at doubled speed in the positive direction.

This condition corresponds to the synchronous condiiton of G-gear 9a at standstill, and when this gear 9a is shifted into meshing engagement, the CO-shaft 3 is also placed into constrained standstill condition. In this switching condition the CO-shaft can be started from standstill in stepless acceleration in the reverse direction of rotation by switching the reversing gear (double connection) into operation and subsequently disengaging the G-gear 9a, while subsequently controlling the lower pump to move from the negative limit position in the direction toward the zero position. However, if during such performance not the reversing gear but the G-gear 9a is placed into operation, then the CO-shaft 3 commences to move in the normal direction of rotation in a degree depending upon the adjusted control position of the pump. If the pump is again placed into the zero position, the two G-shafts again rotate at the same speed. In accordance with the foregoing description relating to the embodiment of Fig. 5, this condition corresponds to one of the two conditions of synchronism required for shifting the spur gears; that is, when one G-gear on one of the two G-shafts is already engaged, the G-gear of the other G-shaft denoted by a corresponding reference number can now be shifted into simultaneous meshing engagement thus establishing a double connection between CI-shaft and CO-shaft. The other condition of synchronous speed is present when the respective speeds of the G-shafts form the ratio C. These two synchronous conditions are obtained with two definite control positions respectively of the pump which are located on the two respective sides of the zero position and are spaced therefrom by the angle α. If it is desired to accelerate by purely hydraulical means from standstill forward as well as reverse to a speed as close as possible to that of the first step or without any gear-shifting at all, then it is advisable to select as the control positions for synchronous speeds the zero position of the pump and the position that differs from the zero position by the angle α and is located in the positive range of displacement.

In comparison with the embodiments of Figs. 5 and 6, the converter shown in Fig. 7 has the advantage that the auxiliary drive, with the exception of constrained standstill and starting, is at rest most of the time or has only a small speed of revolution. This is favorable for relieving the auxiliary drive and for reducing the noise of the converter operation. Besides, the auxiliary drive is subjected to relatively small torque only.

It will be recognized from the various illustrations and the descriptions of the individual embodiments that practically a single design of the spur-gear speed-change mechanism can be employed for all described converter designs. The same applies, with some limitation, to the master control means of the converter. The master control means (not illustrated) may consist of a control drum with machined cam curves and may operate purely mechanically. A large number of mechanically, hydraulically, pneumatically, or electrically operating control devices or combinations of such devices are well known and available for similar control purposes. Once a particular master controller of any of the available types has been selected, the difference in the master controllers required for the respectively different embodiments of converters according to the invention may reside only in a slight variation of the cam contours so that the basic components of the control device, in principle, need not be varied.

Each of the illustrated embodiments of converters according to the invention has certain preferred properties which determine which particular converter is best to be chosen for a given application. However, all of these converters obviate the dificiencies of the conventional spur-gear speed-change gear assemblies and are distinguished by good efficiency when operating in the normal transmission steps. All converters of variable transmission ratio according to the invention possess two-cycle operation if the auxiliary drive controls the speed of only one of the intermediate gear shafts. If the auxiliary drive controls the speed of both intermediate gear shafts, then the converter operates in single-cycle performance. Single-cycle operation is preferable if a greater number of steps is provided because only three spur gears are required in the spur-gear portion of the converter for each two steps. With a smaller number of steps, a converter design for two-cycle operation nevertheless involves no higher manufacturing cost because the drive means for the G-shaft can be given a simpler design.

It will be apparent to those skilled in the art, upon a study of this disclosure, that my invention permits of various modifications and may be embodied in devices other than those particularly illustrated and described, without departing from the essential features of my invention and within the scope of the claims annexed hereto.

I claim:

1. Mechanical torque converter of variable transmission ratio switchable without interruption of power transmitted therethrough, comprising an input shaft, an output shaft, a multi-step spur-gear transmission having two counter shafts parallel to said output shafts, the steps in said multi-step transmission having a graduation in accordance with a constant ratio, each counter shaft having a number of gearings of respective graduated transmission ratios selectively controllable to pass into and out of transmitting engagement with said output shaft, an auxiliary drive of continuously controllable transmission ratio for changing the speed ratio of said respective counter shafts in a range between the value 1 and the ratio of the two steps of said multi-step spur gear transmission which are immediately subsequent said auxiliary drive, said auxiliary drive having two members each selectively operable as input and output member respectively and simultaneously operable with each other, said two members having respective shafts coaxially aligned with said two counter shafts, means connecting each member shaft with the one aligned counter shaft for driving said counter shaft from said member when said member operates as output member, and mechanism connecting said input shaft to the input member of said auxiliary drive and to the counter shaft aligned therewith for simultaneously driving said latter member and counter shaft.

2. Mechanical torque converter of variable transmission ratio switchable without interruption of power transmitted therethrough, comprising an input shaft, an output shaft, a multi-step spur-gear transmission having two counter shafts parallel to said output shaft, the steps in said multi-step transmisison having a graduation in accordance with a constant ratio, each counter shaft having a number of gearings of respective graduated transmission ratios selectively controllable to pass into and out of transmitting engagement with said output shaft, a fluid hydraulic drive of continuously controllable transmission ratio for changing the speed ratio of said respective counter shafts in a range between the value 1 and the ratio of the two steps of said multi-step spur gear transmission which are immediately subsequent said auxiliary drive, said fluid drive having two positive displacement members each operable as fluid transmitter and fluid receiver respectively and simultaneously operable with each other, and fluid conduit means hydraulically interconnecting said two members, said two members having respective shafts coaxially aligned with said two counter shafts, means connecting each member shaft with the one aligned counter shaft for driving said counter shaft from said member when said member operates as receiver, and mechanism connecting said input shaft to the transmitter member of said fluid drive and to the counter shaft aligned therewith for simultaneously driving said latter member and counter shaft.

3. In a converter according to claim 2, each of said positive-displacement members comprising a rotatable multi-cylinder pump, at least one of said pumps being controllable as to volumetric delivery so that the rotating speed of the other pump can be regulated continuously from standstill in both directions of rotation up to the available maximum speed of rotation.

4. In a converter according to claim 3, each of said members of said hydraulic drive being axially aligned with one of said counter shafts and having a rotatable part directly and non-revolvably connected with the respective adjacent, aligned counter shaft.

5. Converter according to claim 2, comprising a constrained permanent connection between said input shaft and one of said two counter shafts, said other counter shaft being connected with said input shaft through said hydraulic drive, and said hydraulic drive being axially aligned with one of said counter shafts and having at least one rotatable member operably connected for being driven from and non-rotatable relative to respective aligned counter shaft, said hydraulic drive being operably connected to said converter input shaft so as to be continuously controllable as to volumetric delivery.

6. Converter according to claim 2, comprising a distributor gearing disposed in coaxial relation to one of said counter shafts and having a coaxially rotatable bridge structure, intermediate gear means journalled on said bridge structure, and two gears of said distributor gearing meshing with said intermediate gear means; said bridge structure being rigidly connected with one of said counter shafts, said input shaft being permanently in geared connection with the other counter shaft and with one of said gears of said distributor gearing, the other gear of said distributor gearing being in mechanical connection with said input shaft through said hydraulic drive, said drive having at least its member that is driven from the input shaft continuously controllable as to volumetric delivery and delivering direction.

7. Converter according to claim 2, comprising a distributor gearing disposed in coaxial relation to said input shaft and having a coaxially rotatable bridge structure, intermediate gear means journalled on said bridge structure, and two gears of said distributor gearing meshing with said intermediate gear means; said bridge structure being rigidly connected with said input shaft, said two gears of said distributor gearing being connected with the respective counter shafts, one of said counter shafts being additionally connected through said hydraulic drive with said input shaft, said hydraulic drive having at least its member that is driven from the input shaft continuously controllable in a continuous manner as to volumetric delivery and direction of delivery.

8. Converter according to claim 2, comprising a distributor gearing disposed in coaxial relation to said input shaft and having a coaxially rotatable bridge structure, intermediate gear means journalled on said bridge structure, and two gears of said distributor gearing meshing with said intermediate gear means; said bridge structure being rigidly connected with said input shaft, said two gears of said distributor gearing being respectively connected with said counter shafts, said counter shafts being also connected with each other through said hydraulic drive, and said hydraulic drive having at least one of said members controllable as to volumetric delivery.

9. In a converter according to claim 2, each of said positive-displacement members of said hydraulic drive having a movable delivery control structure, one of said members being controllable over the entire positive and negative range of delivery, the respective control structures of both members being in constrained connection with each other, and the other member being controllable by said constrained connection only over a partial range adjacent to the control position of maximum volumetric delivery, said partial-range member having smallest delivery when the full-range controllable member is set for largest delivery.

10. Converter according to claim 2, comprising two distributor gearings each having a bridge structure rotatable in coaxial relation to one of said respective counter shafts, intermediate gear means journalled on said bridge structure, and two gears of said distributor gearing meshing with said intermediate gear means; said bridge structures being rigidly connected with said respective counter shafts, said input shaft being connected with one of said gears of each of said two distributor gearings, and the other gears of said respective distributor gearings being connected with each other and being also in mechanical connection through said hydraulic drive with the input shaft, said other gears being capable of performing only a mutually opposed rotation at a rotating speed and direction determined by said hydraulic drive, and said drive having at least the one member that is driven from the input shaft controllable as to volumetric delivery and direction of delivery.

11. In a converter according to claim 2, said fluid conduit means comprising two oil passages leading to said respective members of said hydraulic drive, two pressure-responsive valves inserted into said passages respectively, said valves permitting the oil to escape from one into the other passage upon occurrence of excessive pressure in said one passage.

12. In a torque converter according to claim 2, said multi-step spur-gear transmission having a reversing step and a lowest-speed forward step, one of said two counter shafts being in operative engagement with said reversing step when said other counter shaft is in engagement with said lowest-speed forward step.

13. In a torque converter according to claim 2, at least two spur gears of said number of gearings of at least one of said counter shafts being combined in a unit axially displaceable with respect to said counter shaft and non-rotatably connected thereto.

14. In a torque converter according to claim 2, said hydraulic drive having speed-ratio control members of variable regulating position and constrainedly connected to said spur-gear transmission so that the particular regulating position of each of said speed-ratio control members is dependent upon the particular mutual position of the respective gearings of said spur-gear transmission.

15. In a torque converter a variable transmission ratio switchable without interruption of power transmitted therethrough and equipped with a converter input shaft, a spur-gear speed-change mechanism having a plurality of stages, and continuously regulatable hydraulic auxiliary transmission means operably connected to said speed-change mechanism and including a hydraulic pumping unit and a hydraulic motor unit; means for regulating at least one of said hydraulic transmission units as to quantity of delivery, means operably connecting the other of said hydraulic transmission units to said one hydraulic transmission unit so that the rotating speed of said other hydraulic unit varies continuously from standstill in both directions of rotation up to an available maximum speed of rotation, a counter-gearing shaft axially aligned with each of said two hydraulic transmission units, and a rotating speed-changing part in each of said hydraulic transmission units operably connected to a respective one of said counter-gearing shafts and non-rotatable relative to the latter, the stages in said spur-gear speed-change mechanism being graduated in accordance with a constant ratio and said hydraulic auxiliary transmission cooperating with said spur-gear speed-change mechanism so as to have in said auxiliary transmission a variable range adjustable between the value 1 and the ratio of the two immediately subsequent ones of said stages in said spur-gear speed-change mechanism.

References Cited in the file of this patent
UNITED STATES PATENTS

| | | |
|---|---|---|
| 1,388,578 | Kins | Aug. 23, 1921 |
| 1,453,032 | Von Soden-Fraunhoferl | Apr. 24, 1923 |
| 1,453,432 | Bremer | May 1, 1923 |
| 1,892,573 | Harvey | Dec. 7, 1932 |
| 2,347,261 | Harrington | Apr. 25, 1944 |
| 2,383,092 | Wohlmark | Aug. 21, 1945 |
| 2,384,962 | Pohl | Sept. 18, 1945 |
| 2,386,540 | Campodonico | Oct. 9, 1945 |
| 2,416,154 | Chilton | Feb. 18, 1947 |
| 2,500,308 | Campodonico et al. | Mar. 14, 1950 |
| 2,553,958 | Chelminski et al. | May 22, 1951 |
| 2,618,988 | Harrington | Nov. 25, 1952 |
| 2,808,737 | Bullard | Oct. 8, 1957 |

FOREIGN PATENTS

| | | |
|---|---|---|
| 935,298 | France | Feb. 2, 1943 |